(12) United States Patent
Moriyama et al.

(10) Patent No.: US 6,257,773 B1
(45) Date of Patent: Jul. 10, 2001

(54) OPTICAL MODULE AND OPTICAL REFLECTING MEMBER

(75) Inventors: Yutaka Moriyama; Sosaku Sawada, both of Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/251,929

(22) Filed: Feb. 18, 1999

(30) Foreign Application Priority Data

Feb. 20, 1998 (JP) .................................................. 10-038741

(51) Int. Cl.[7] ...................................................... G02B 6/36
(52) U.S. Cl. ................................................ 385/92; 385/94
(58) Field of Search ........................ 385/88–94; 362/555, 362/560

(56) References Cited

U.S. PATENT DOCUMENTS

| | | | |
|---|---|---|---|
| 5,023,447 | * 6/1991 | Masuko et al. | 250/227.24 |
| 5,068,865 | 11/1991 | Ohshima et al. | 372/36 |
| 5,390,265 | 2/1995 | Jiao | 385/15 |
| 5,515,468 | 5/1996 | DeAndrea et al. | 385/88 |
| 5,617,495 | * 4/1997 | Funabashi et al. | 385/92 |
| 6,004,046 | * 12/1999 | Sawada | 385/92 |

FOREIGN PATENT DOCUMENTS

| | | |
|---|---|---|
| 0804323 | 11/1997 | (EP) . |
| 2162335 | 1/1986 | (GB) . |
| 2182457 | 5/1987 | (GB) . |
| 63-090866 | 4/1988 | (JP) . |

OTHER PUBLICATIONS

Copy of European Search Report for counterpart application No. EP99102727, dated Dec. 1, 2000.

* cited by examiner

Primary Examiner—Robert H. Kim
Assistant Examiner—Michael P. Stafira
(74) Attorney, Agent, or Firm—Smith, Gambrell & Russell, LLP (57) ABSTRACT

The present invention provides an optical module, in which aligning adjustment is much easier than conventional module while a high optical coupling efficiency between an optical fiber and a semiconductor device is maintained. The module comprises a structure for effectively suppressing the decrease in optical coupling efficiency caused by changes in ambient temperature. The optical module comprises an optical reflecting member having a reflecting surface with a concave surface form for optically coupling the optical fiber and the semiconductor device to each other, and a deterioration-suppressing structure in which the change in shape of the reflecting member caused by changes in ambient temperature effectively suppresses the deterioration in optical coupling state between the optical fiber and semiconductor device due to changes in temperature or the like.

11 Claims, 8 Drawing Sheets

OPTICAL MODULE AND OPTICAL REFLECTING MEMBER

BACKGROUND OF THE INVENTION

1. Field of the Invention

The present invention relates to an optical module, used in optical communications, incorporating therein a semiconductor device such as light-receiving device or light-emitting device; and an optical reflecting member for optically coupling an optical fiber and the semiconductor device to each other with high accuracy.

2. Related Background Art

A conventional optical module in which an optical fiber acting as a transmission medium for signal light and a semiconductor device such as light-receiving device or light-emitting device are optically coupled to each other such modules employs a structure for maintaining the optically coupled state between the optical fiber and semiconductor device by integrally encapsulating a condenser lens and a plane reflecting surface located in the optical path between an end face of the optical fiber and the semiconductor device. As the conventional optical module, for example, Japanese Patent Application Laid-Open No. 63-090866 discloses an optical receiver module configured such that light emitted from an end face of an optical fiber and then passed through a condenser lens is reflected by a plane reflecting surface to be incident on the light-receiving surface of a light-receiving device.

SUMMARY OF THE INVENTION

Having studied the conventional optical module, the inventors have found the following problems. While the conventional optical module employs a configuration in which a condenser lens and a plane reflecting mirror are integrally encapsulated with a transparent resin together with a semiconductor device, it is necessary to establish optical axis alignment between the condenser lens and the plane reflecting mirror and semiconductor device, and encapsulate them with a resin after the position of the semiconductor device is set with a sufficiently high accuracy. However, it has been quite difficult to improve the positioning accuracy of such a semiconductor device, whereby this technique has been unsuitable for making an optical module employed in the field of optical communications.

Although the conventional optical module is applicable to fields which do not require a relatively high accuracy, e.g., a field which allows a relatively broad luminous flux incident on a light-receiving device having a large light-receiving area, it can not be used a field in which a very high alignment accuracy is required such as optical communications because the core diameter of the optical fiber is only about a few $\mu$m and the light-receiving area of the light-receiving device only about several hundred square $\mu$m. When an optical module for optical communications is manufactured by employing a conventional technique, there has been a possibility to occur detrimental effects such as the lowering of the optical coupling efficiency between the optical fiber and the semiconductor device.

In recent years, as the transmission speed in optical fiber communications has been reaching a GHz band, there has been a demand for developing an optical module which can attain a higher aligning accuracy.

The optical module according to the present invention comprises a configuration in which alignment can be adjusted much more easily than conventional module and which is less likely to be influenced by ambient temperature while maintaining a high optical coupling efficiency between an optical fiber and a semiconductor device.

The optical module according to the present invention comprises a housing, having a mounting surface for mounting a semiconductor device; a sleeve, extending along a predetermined direction from a side wall of the housing, for supporting a ferrule attached to a font end of an optical fiber; and an optical reflecting member, for optically coupling the optical fiber and the semiconductor device to each other, having a curved reflecting surface, put in the housing. Here, the semiconductor device encompasses, at least, a light-emitting device and a light-receiving device. The optical module encompasses an optical transmitter module in which a light-emitting device is mounted, while the light-emitting surface of the light-emitting device and the end face of an optical fiber are optically coupled to the light-emitting device; and an optical receiver module in which a light-receiving device is mounted, while the light-receiving surface of the light-receiving device and the end face of an optical fiber are optically coupled to the light-receiving device.

In particular, the reflecting surface of the optical reflecting member preferably has a concave form coinciding with a portion of a virtually defined rotational ellipsoid. In order to attain a high aligning accuracy, the optical reflecting member having such a form is installed at a predetermined position within the housing such that the core of the exit end face of the optical fiber coincides with the first focal point of the rotational ellipsoid, whereas the surface of the semiconductor device (the light-emitting surface in the light-emitting device or the light-receiving surface in the light-receiving device) coincides with the second focal point of the rotational ellipsoid.

In the optical receiver module, even if a signal luminous flux is emitted from the end face of the optical fiber with an angle, it will be reflected by a certain portion of the reflecting surface and reach the light-receiving surface of the light-receiving device as long as the end face coincides with the first focal point. On the other hand, in the case of an optical transmitter module, the light emitted from the light-emitting surface of the light-emitting device with an angle also reaches the end face of the optical fiber due to the action of the reflecting surface mentioned above.

Figure 1:
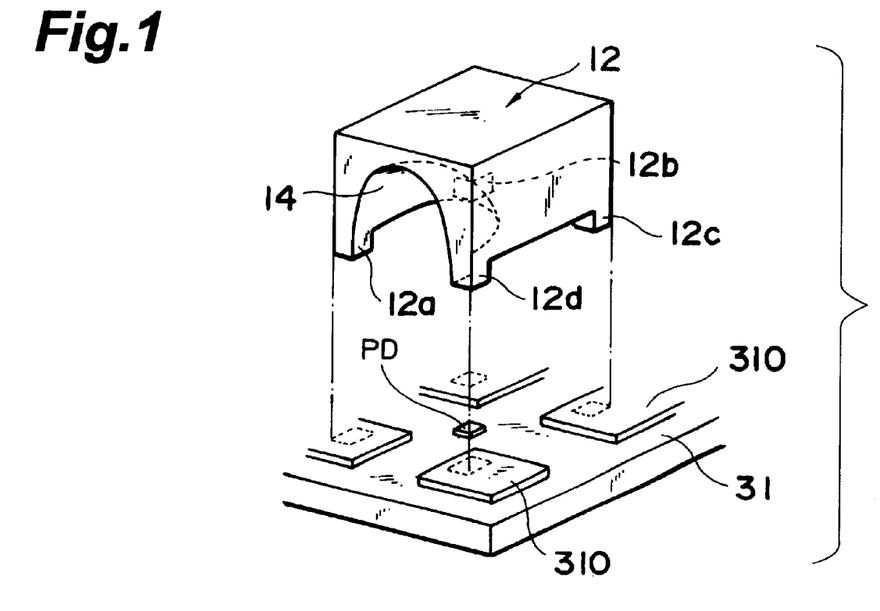
FIG. 1 is a view for explaining a typical method of installing an optical reflecting member.

In general, a resin material is utilized as the material for the optical reflecting member due to its productivity, whereas, as shown in FIG. 1, feet of a resin-molded optical reflecting member 12 (lower end portions 12a to 12d) are directly attached with an adhesive onto the mounting surface, on which the semiconductor device (e.g., photo diode PD) is mounted. In this specification, the mounting surface in the housing means not only the upper face of a main plate 31 on which the PD is directly mounted, but also the upper faces of spacers 310.

Figure 2:
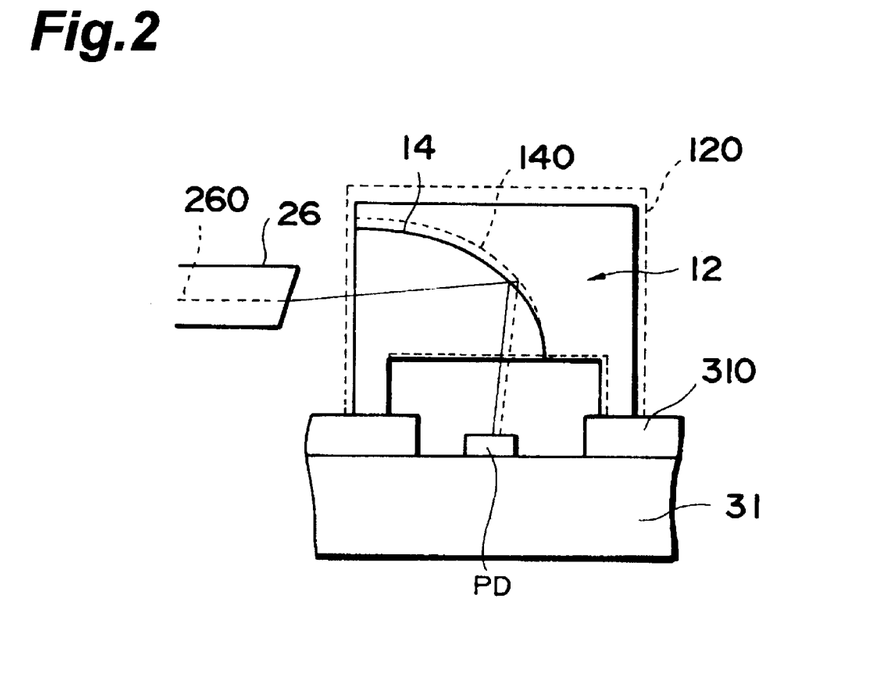
FIG. 2 is a view for explaining how the shape of the reflecting surface changes in the optical reflecting member installed by the typical method shown in FIG. 1.

The resin material employed in the optical reflecting member 12 has a high thermal expansion coefficient. When the heat generated from the semiconductor device during the operation of the optical module or the heat generated by circuit components is directly transmitted to the optical reflecting member 12 via the lower end portions 12a to 12d, unexpected stress will be applied to the optical reflecting member 12. When the optical reflecting member 12 itself is deformed by thermal expansion, the position of the reflecting surface 14 may change or the curvature thereof may fluctuate, thereby remarkably lowering the optical coupling efficiency between the semiconductor device and the optical fiber as shown in FIG. 2. In FIG. 2, a broken line 120 indicates a thermally expanded optical reflecting member, whereas a broken line 140 indicates the reflecting surface of the thermally expanded optical reflecting member.

In an optical module using a resin-molded reflecting member, stress may remain through a thermal process in its assembling step. When stress remains in the resin-molded optical reflecting member, a difference in temperature between its manufacture environment and operation environment (change of the ambient temperature) causes the installed position of the reflecting surface to be displaced or its curvature to fluctuate (the shape of the optical reflecting member as a whole would change due to thermal expansion). Therefore, the light-collecting position on the light-receiving surface of the semiconductor device would shift and the sensitivity of PD would fluctuate. In the case where a laser diode LD or laser emitting device LED is mounted as the semiconductor device, the optical coupling efficiency between the LD or LED and the optical fiber would fluctuate due to the displacement of the reflecting surface of the optical reflecting member.

The optical module according to the present invention comprises a deterioration-suppressing structure for suppressing the deterioration of the optical coupling state between an optical fiber and a semiconductor device.

The deterioration-suppressing structure, the optical module according to the present invention has a support structure for maintaining the optical reflecting member at a predetermined position in the housing separated from the mounting surface by a predetermined distance.

This support structure can be realized, for example, by holding side faces of the optical reflecting member with a pair of auxiliary plates made of a metal material or ceramic material, and fixing a part of each auxiliary plate to the mounting surface where the optical reflecting member is separated from the mounting surface by a predetermined distance. Alternatively, while one end of each of a plurality of stand pins made of a metal material or ceramic material is fixed to the bottom face of the optical reflecting member, the other ends of the stand pins may be bonded and fixed to the mounting surface to separate the optical reflecting member from the mounting surface by a predetermined distance.

Further, the optical module according to the present invention may be configured that, for the deterioration-suppressing structure for suppressing the change in form of the optical reflecting member (attributed to the change in ambient temperature) caused by the remaining stress, a counter member made of a resin having a thermal expansion coefficient different from and compensated to that of the optical reflecting member is embedded within a depression formed at a predetermined location of the optical reflecting member.

The optical module according to the present invention can combine the above-mentioned support structure with the structure in which the counter member is embedded within the optical reflecting member.

In the optical reflecting member made of a resin material such as mentioned above, a reflecting surface of the optical reflecting member is coated with a metal such as gold (Au) in order to enhance the reflectivity. This process is often carried out such that, in order to improve the adhesiveness of the coating, a chromium (Cr) layer is deposited and then Au is coated thereon.

When an optical reflecting member in which Cr and Au layers are successively deposited on a surface of a resin-molded body as mentioned above is put in a high-temperature of about 110° C. for a long period, then its reflecting film, i.e., the Cr and Au layers may crack deteriorating its reflection characteristic.

Having studied deterioration in characteristics of reflecting films by using auger electron spectroscopy (AES) analysis, the inventors have found that the reason of the deterioration in their reflection characteristics, i.e., the reason of cracks generated in the Cr and Au layers, is the oxidation of Cr.

Therefore, the optical reflecting member according to the present invention may comprise a resin-molded body having a surface with a predetermined form which is provided with a reflecting film, the reflecting film comprising an nickel (Ni) layer formed on the surface and an Au layer formed on the Ni layer.

The coating of Au layer as the reflecting film can enhance the reflectivity of the reflecting surface in the optical reflecting member, and the forming of the Ni layer between the resin-molded body and the Au layer can secure the adhesiveness of the coating. Here, the Ni layer disposed between the resin-molded body and the Au layer for securing the adhesiveness of the coating would not be oxidized, whereby no cracks would occur in the Ni layer.

In the optical reflecting member according to the present invention, the resin may be polycarbonate. When polycarbonate is used, then an optical reflecting member with excellent in thermal resistance, shock resistance, and dimensional stability is realized.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIGS. 5A and 5B are views for explaining functions of the optical module according to the present invention, in which FIG. 5A is a view for explaining the form of an optical fiber end face, whereas

FIGS. 8A to 8C are views showing structures for preventing the shape of the reflecting surface from changing upon thermal expansion of the optical reflecting member in the optical module according to the present invention, in which

FIGS. 9A and 9B are views for explaining assembling steps and functions of the embodiment shown in FIG. 8A, in which FIG. 9A is a view for explaining a method of bonding the optical reflecting member and each auxiliary plate together, whereas FIGS. 10A to 10C are sectional views showing an inner configuration of the optical module shown in FIG. 4, in which

DESCRIPTION OF THE PREFERRED EMBODIMENTS

In the following, embodiments of the optical module according to the present invention will be explained with reference to FIGS. 3, 4, 5A, 5B, 6, 7, and 8A to 10C. Among the drawings, parts identical to each other will be referred to with numerals identical to each other, without their overlapping explanations being repeated. The optical module encompasses an optical receiver module employing a semiconductor light-receiving device and an optical transmitter module employing a semiconductor light-emitting device. Since their basic configurations are identical to each other except for the semiconductor devices employed, only the light-receiving module will be explained hereinafter in this specification.

Figure 3:
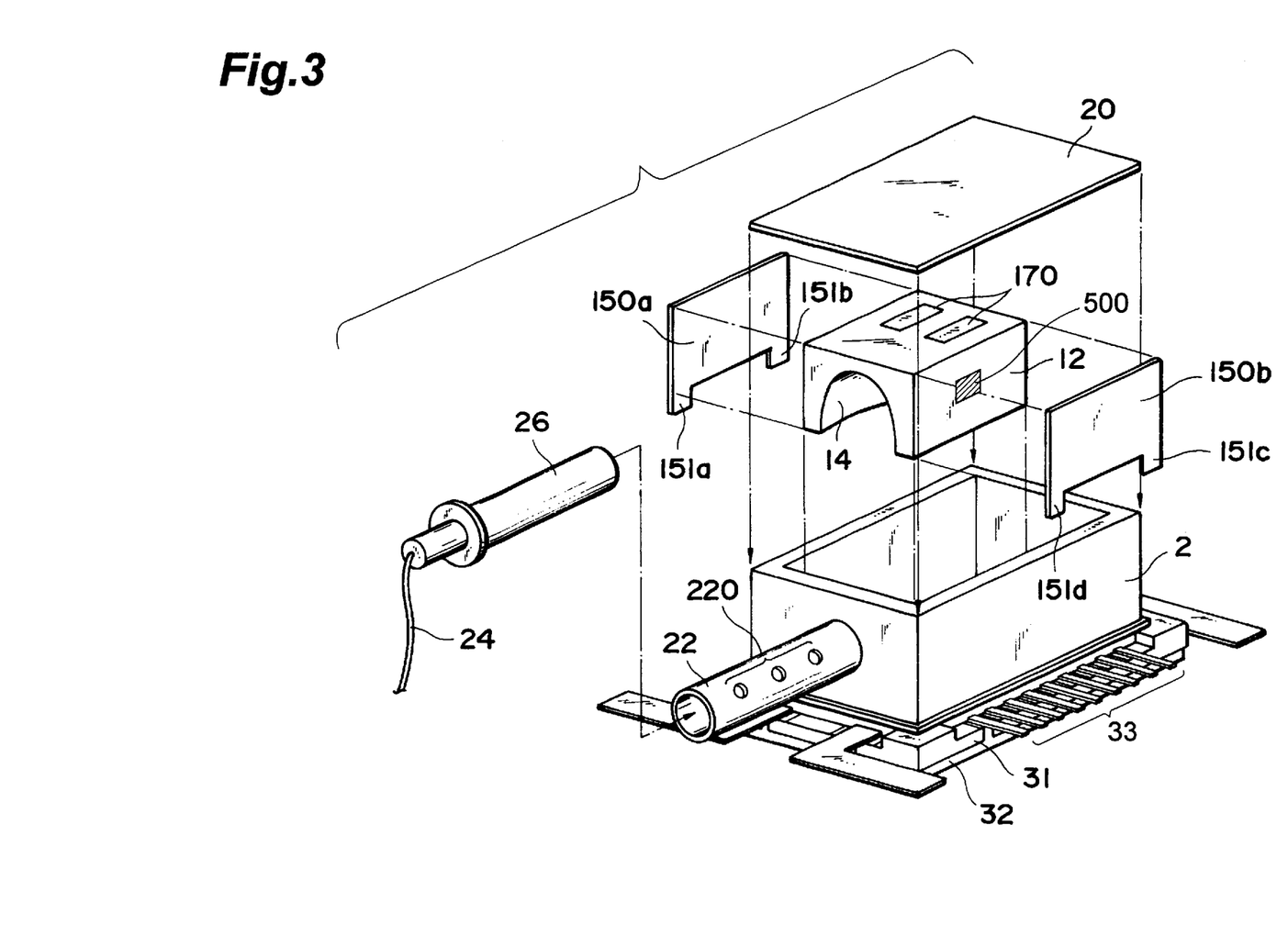
FIG. 3 is a view showing an assembling step for explaining a schematic configuration of the optical module according to the present invention.
Figure 4:
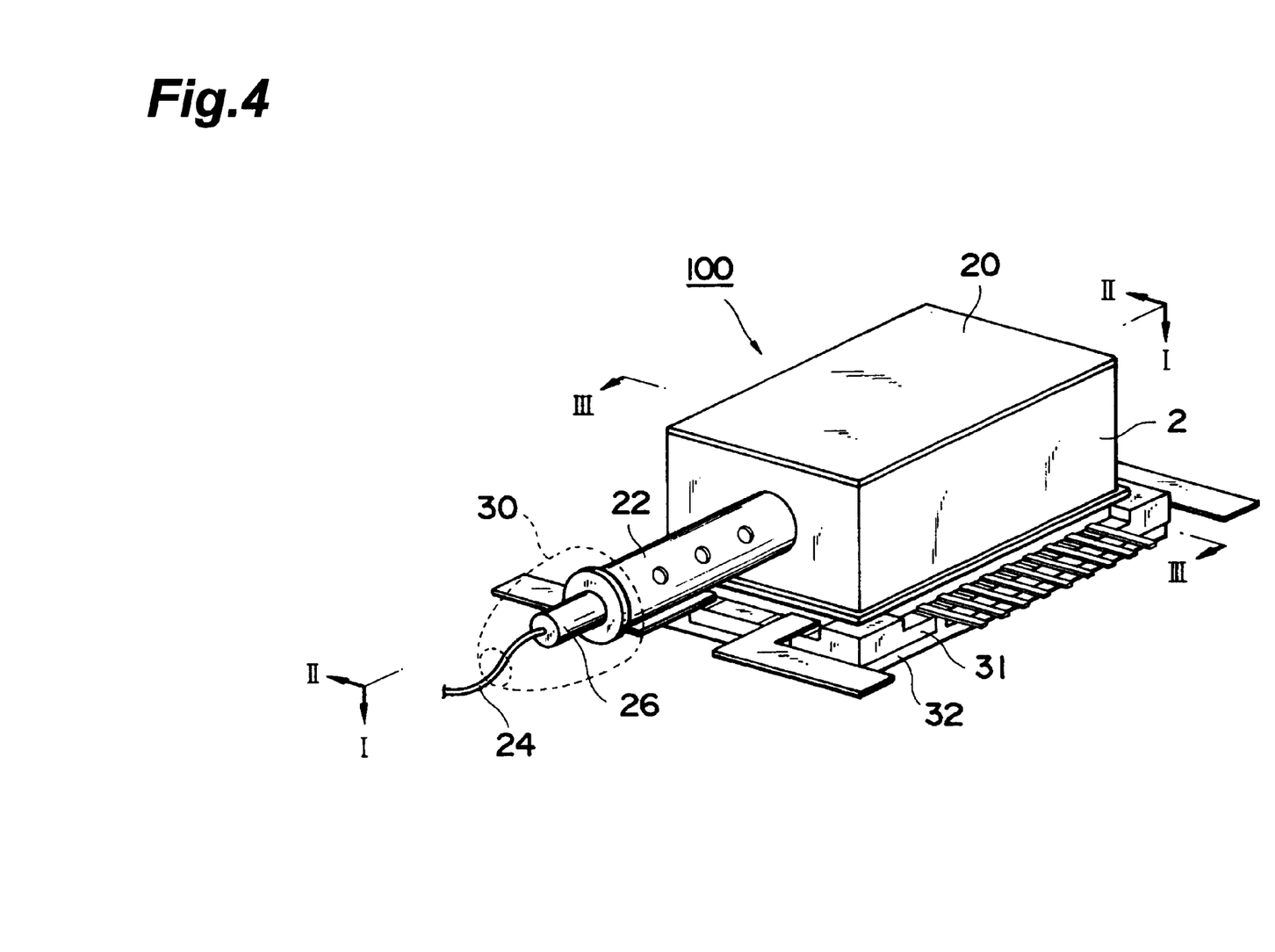
FIG. 4 is a perspective view showing the exterior of the optical module obtained through the assembling step of FIG. 3.

FIG. 3 is a view showing an assembling step for explaining the schematic configuration of an optical receiver module, whereas FIG. 4 is a perspective view showing the exterior of the optical receiver module 100 obtained through the assembling step of FIG. 3.

As shown in FIG. 3, the optical receiver module comprises a housing 2, having a mounting surface for mounting a semiconductor light-receiving device. A side wall of the housing 2 is provided with a sleeve 22 for supporting a ferrule 26 therein. The bottom part of the housing 2 comprises a plurality of lead pins supported by an insulating member 31.

After an optical reflecting member 12 is put on a predetermined position in the housing 2, a lid 20 is sealed with an adhesive. Also, the ferrule 26 is inserted into the sleeve 22. As shown in FIG. 3, the sleeve 22 is provided with a plurality of rows of through holes 200, arranged along the extending direction of the sleeve 22.

In particular, a pair of auxiliary plates 150a, 150b are fixed, with an adhesive 500, to side faces of the optical reflecting member 12. The auxiliary plates 150a, 150b are provided with feet 151a and 151b, 151c and 151d, respectively, functioning as spacers for separating the optical reflecting member 12 from the mounting surface. The optical reflecting member 12 may also have a configuration embedded with counter members 170 in a predetermined location for restraining the shape of the optical reflecting member 12 from changing its form due to the stress remaining.

Here, the alignment between the reflecting surface 14 of the optical reflecting member 12 and the light-receiving device 6 and the end face of the optical fiber 24 is carried out as follows. The optical reflecting member 12 whose side faces are provided with a pair of auxiliary plates 150a, 150b is put into the housing 2, and the light-receiving surface of the light-receiving device 6 is made to coincide with one focal point A of a rotational ellipsoid R. On the other hand, while the end face of the core in the optical fiber 24 is made to coincide with the other focal point B, the feet 151a to 151d of the auxiliary plates 150a, 150b are firmly attached to the inner bottom end face 4b (see FIGS. 10A to 10C) of the housing 2, acting as the mounting surface, with an adhesive or the like after their mutual positions are adjusted. In this positioning step, even after the optical reflecting member 12 is installed at a predetermined position in the housing 2, if the position of the end face of the optical fiber 24 is minutely adjusted in the direction of the optical axis P, then the end face of the optical fiber 24 can be made to coincide with the focal point B (see FIG. 5B).

In the optical receiver module having such a configuration, a light hν emitted with an angle from the end face of the optical fiber 24 passes through a light entrance hole 16 and a window member 18 at the side wall of the housing 2 to reach the reflecting surface 14 of the reflecting member 12. Then, the light hν reflected by the reflecting surface 14 is collected to the light-receiving surface of the light-receiving device 6. Since the light-receiving surface of the light-receiving device 6 and the end face of the optical fiber 24 coincide with the focal points A and B, respectively, even if the light hν emitted from the end face has various emanating directions, it will always reach the light-receiving surface of the light-receiving device 6. As a consequence, an alignment mechanism having an essentially high accuracy is realized.

Figure 5A:
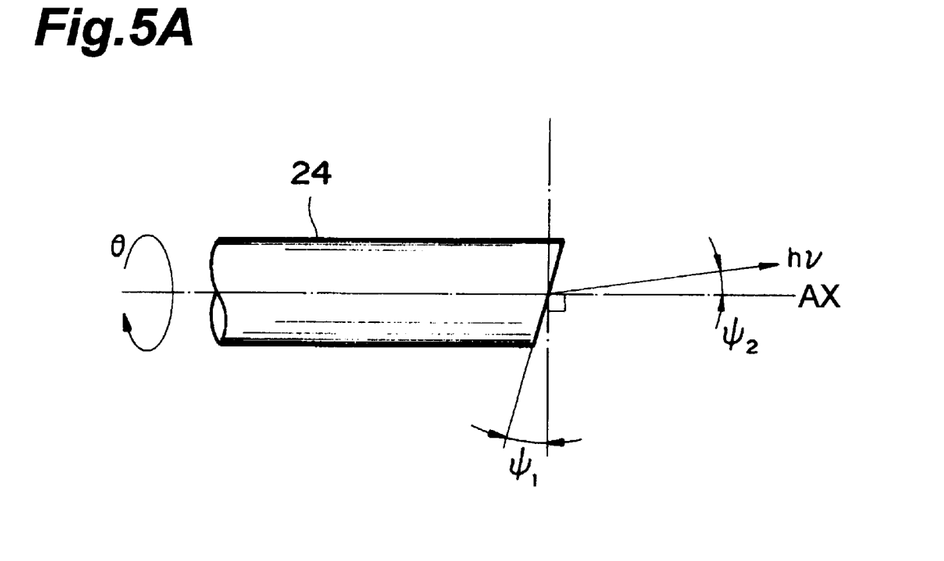
Figure 5B:
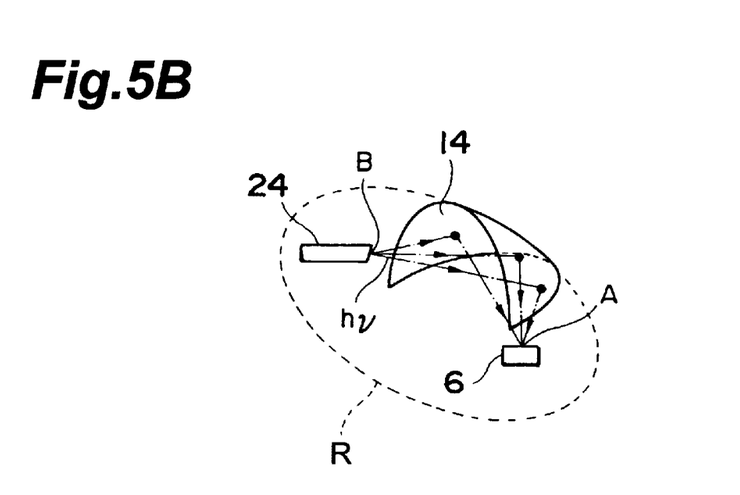
FIG. 5B is a view for explaining an aligning function between the optical fiber and a semiconductor device.

The end face of the optical fiber 24 is obliquely ground by a predetermined angle $\psi_1$ (e.g., $\psi_1=8°$) with respect to the optical axis AX in order to prevent the light reflected by the end face from returning onto the same optical axis. The light hν thus emitted from the obliquely cut end face is diffracted with respect to the optical axis AX of the optical fiber 24 by an angle $\psi_2$ (e.g., $\psi_2=4°$) which is ½ of the grinding angle $\psi_1$. If the end face of the optical fiber 24 rotates about the optical axis AX, the light hν is emitted will be uncertain. In the conventional optical receiver module configured such as to reflect the light by a plane reflecting mirror may be problematic in that the emitted luminous flux shifts from the light-receiving surface of the light-receiving device, thereby lowering the optical coupling efficiency, and fine adjustment with a very high accuracy is necessary. In the optical receiver module according to this embodiment, as shown in FIG. 5B, even if the light hν has various emanating directions, it will be reflected by the reflecting surface 14 at a certain portion and always reach the light-receiving surface of the light-receiving device 6 positioned at the focal point A as long as the end face of the optical fiber 24 coincides with the focal point B. The influence of the above-mentioned dependence on rotation can be neglected, therefore it becomes unnecessary to adjust the rotating direction θ of the optical fiber 24.

Since the optical reflecting member 12 is formed separately of the housing 2, fine alignment of its attached position can easily be carried out after being installed at a predetermined position. Further, the single optical reflecting member 12 can realize an essentially excellent alignment mechanism without requiring a plurality of optical elements to be assembled together to realize an accurate aligning mechanism. Not only the number of components can be reduced, but also the adjusting positions, packaging area, packaging cost, and aligning cost can be cut down.

As the optical reflecting member 12, a resin-molded body provided with a reflecting film will now be explained with reference to FIGS. 6 and 7.

Figure 6:
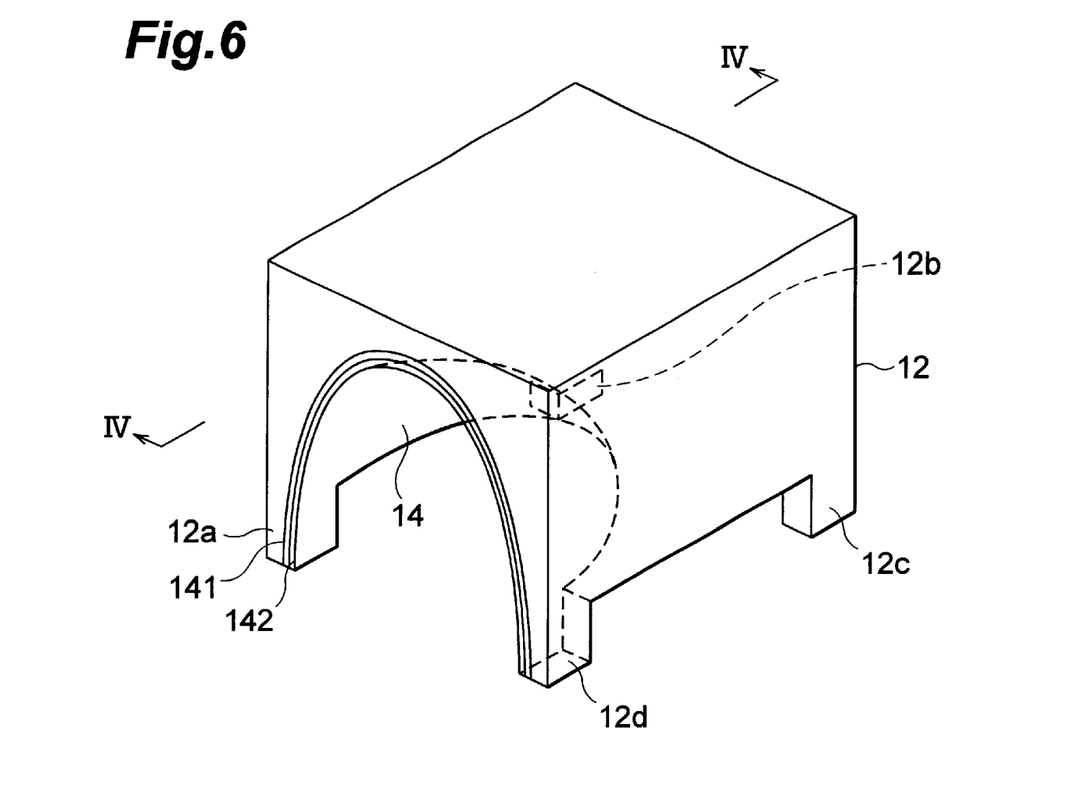
FIG. 6 is a perspective view showing the configuration of an optical reflecting member provided with a reflecting film.
Figure 7:
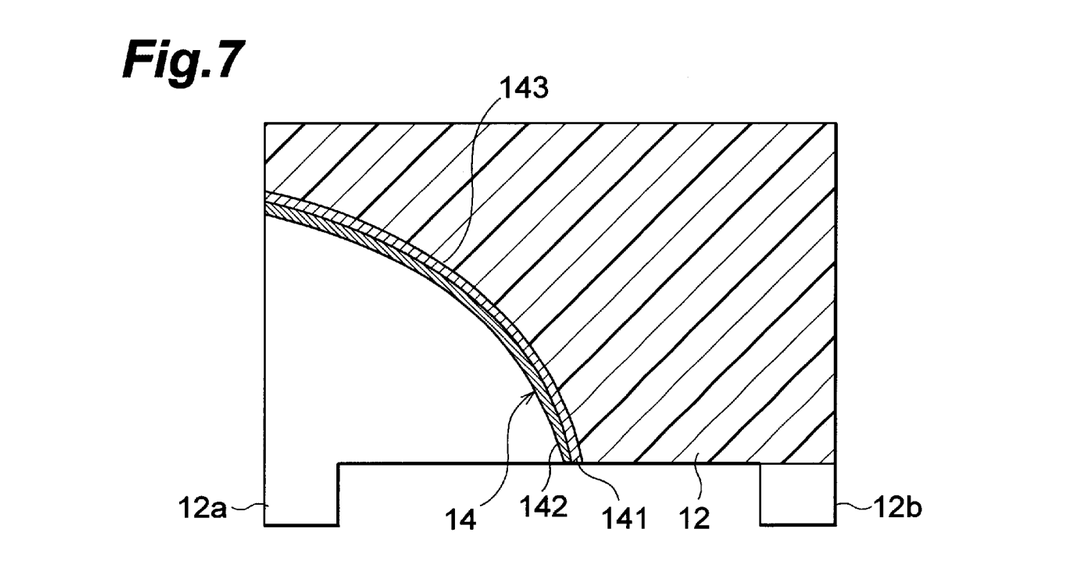
FIG. 7 is a sectional view taken along the IV—IV line of the optical reflecting member shown in FIG. 6.

FIG. 6 is a perspective view of the optical reflecting member (resin-molded body) 12, whereas FIG. 7 is a sectional view of the optical reflecting member 12 shown in FIG. 6 taken along the IV—IV line.

The optical reflecting member 12 is a resin-molded body constituted by a surface 143 processed into a predetermined shape and a reflecting film disposed on this surface 143. The reflecting film comprises a Ni layer 141 formed on the surface 143, and an Au layer 142 formed on the Ni layer 141. In this embodiment, the surface 14 of the Au layer 142 functions as the reflecting surface of the optical reflecting member 12.

As the main component of the resin-molded body constituting the optical reflecting member 12, polycarbonate is preferable. The resin-molded body is shaped like a rectangular parallelepiped partly formed with the depressed surface 143. More specifically, the surface 143 is a concave surface coinciding with a portion of the virtually defined rotational ellipsoid R (see FIG. 5B). Also, the four corners in the lower portion of the resin-molded body are provided with legs 12a to 12d for stably installing the optical reflecting member 12 in the housing 2. If a support structure which will be mentioned later is provided, the legs 12a to 12d will be unnecessary. The whole surface 143 is formed with the Ni layer 141 having a thickness of about 1000 angstroms. The Ni layer 141 is formed by the vacuum evaporation.

On the Ni layer 141, the Au layer 142 having a thickness of about 2000 angstroms is formed. The Au layer 142 is formed by vacuum evaporation on the Ni layer 141. The surface 14 of the Au layer 142 functions as the reflecting surface and has a form coinciding with a portion of the virtually defined rotational ellipsoid R as shown in FIG. 5B.

Operations and effects of the optical reflecting member having thus formed reflecting film will now be explained. In the optical reflecting member 12, the Ni layer 141 and the Au layer 142 are successively coated as the reflecting film on the depressed surface 143. The coating of the Au layer 142 can enhance the reflectivity of the optical reflecting member 12. On the other hand, the forming of the Ni layer 141 between the surface 143 and the Au layer 142 can secure the adhesiveness between the resin-molded body and Au layer 142. When the Ni layer 141 is disposed between the resin-molded body and the Au layer 142 in order to secure the adhesiveness of coating, then the Ni layer 141 is prevented from cracking even under a high-temperature ambient. The optical reflecting member 12 comprising the reflecting film made of the Ni layer 141 and the Au layer 142 would not deteriorate its reflection characteristic even under the high-temperature ambient.

It has been confirmed that, all of 10 samples cracked for a conventional optical reflecting member in which a Cr layer was disposed between a resin-molded body and an Au layer when kept for 24 hours under a temperature of 120° C. While, no crack occurred in the optical reflecting member 12 according to this embodiment even when kept for 2000 hours under the same condition.

When the resin-molded body is formed as a molded body of polycarbonate, the optical reflecting member 12 according to this embodiment can improve its thermal resistance, shock resistance, and dimensional stability.

The structure for effectively suppressing the deterioration of optical coupling state according to the present invention will now be explained with reference to FIGS. 8A to 8C.

Figure 8A:
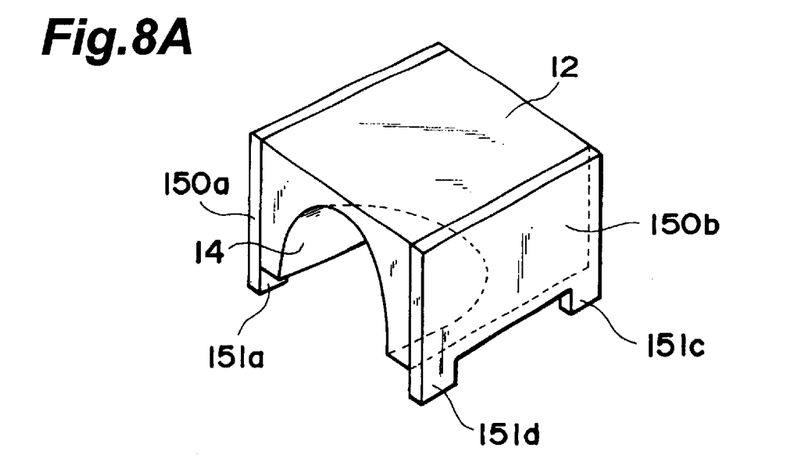
FIG. 8A shows a first support structure for separating the optical reflecting member from its mounting surface.
Figure 8B:
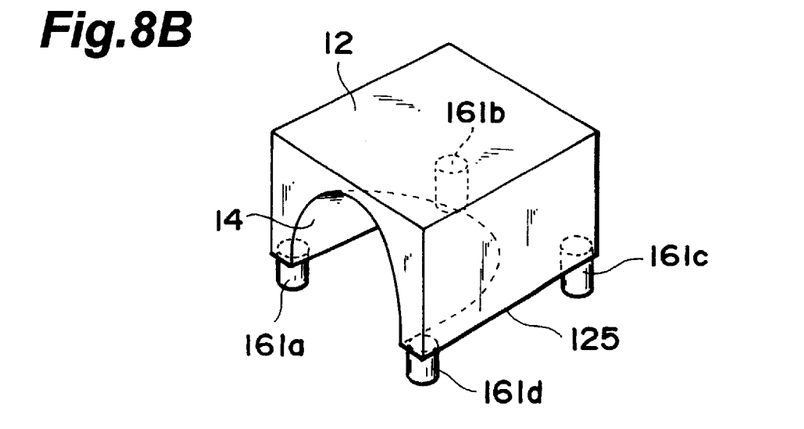
FIG. 8B shows a second support structure for separating the optical reflecting member from the mounting surface.

FIGS. 8A and 8B are views each showing a support structure for installing the optical reflecting member 12 at a predetermined position in the housing 2 separated from the mounting surface therein. In particular, the support structures shown in FIGS. 8A and 8B have a function to prevent heat from being transmitted from the mounting surface of the housing 2 to the optical reflecting member 12. Namely, the first support structure is realized by a pair of auxiliary plates 150a, 150b bonded and fixed to side faces of the optical reflecting member 12 as shown in FIG. 8A. These auxiliary plates 150a, 150b are provided with the feet 151a and 151b, 151c and 151d, respectively, which have a function as spacers for separating the optical reflecting member 12 from the mounting surface.

Figure 9A:
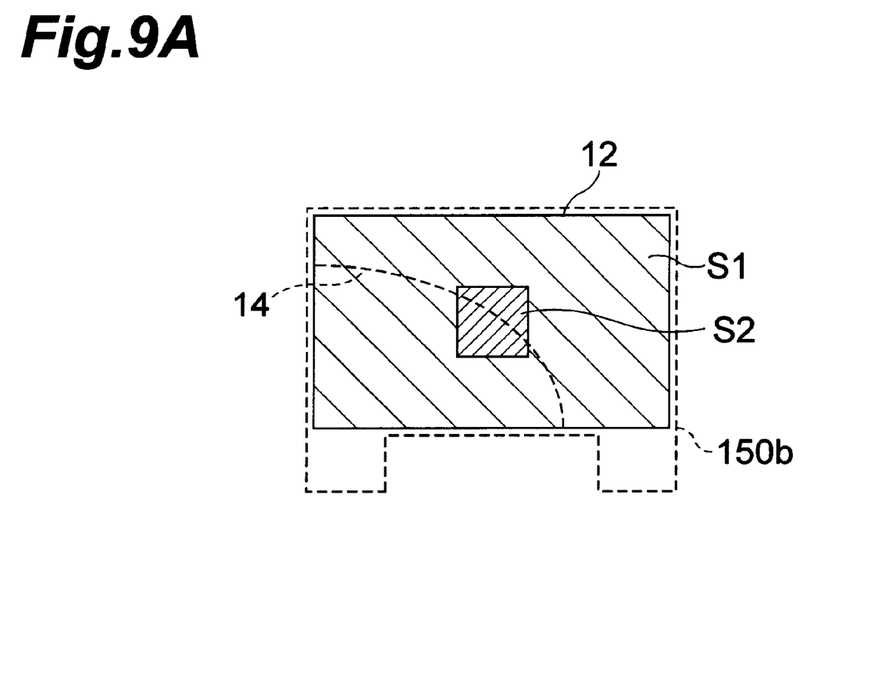
Figure 9B:
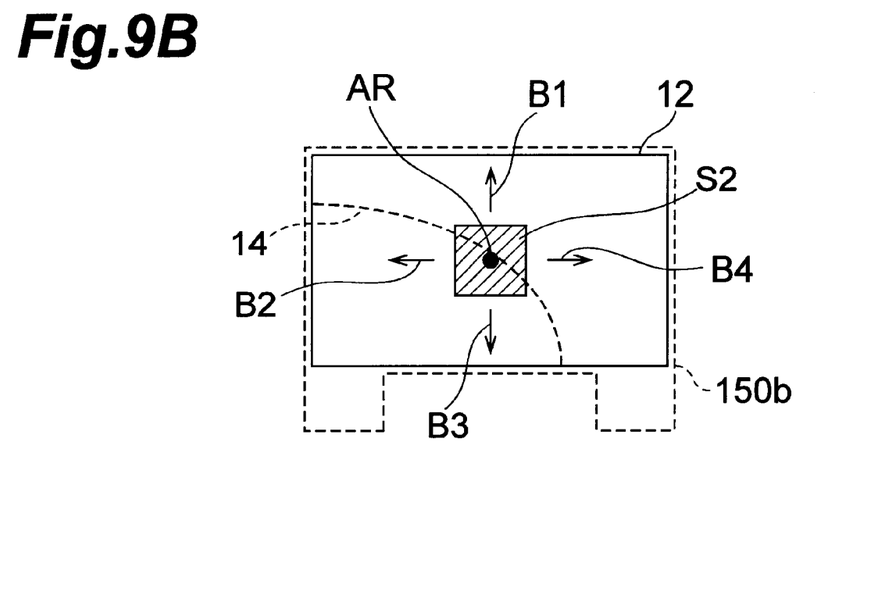
FIG. 9B is a view for explaining functions of the optical reflecting member obtained by the method shown in FIG. 9A.

In the first support structure, as shown in FIG. 9A, the auxiliary plates 150a, 150b are fixed to their corresponding side faces of the optical reflecting member 12 with the adhesive 500 (see FIG. 3). The bonding area (area of the region S2 coated with the adhesive 500) in each side face of the optical reflecting member 12 is preferably smaller than the area of the region S1 covered with its corresponding auxiliary plate 150a, 150b. In particular, the bonding areas S2 are preferably positioned to hold therebetween a predetermined area AR at which the light emitted from the optical fiber is reflected on the reflecting surface 14. It is due to the fact that the optical reflecting member 12 expands along the respective directions indicated by arrows B1 to B4 about the location to which it is fixed (the part S2 bonded to the auxiliary plate) when the ambient temperature rises (see FIG. 9B). Thus, as long as each bonding area S2 is positioned at the center of the area S1 covered with the auxiliary plate 150a, 150b, the position of the reflecting area AR is not influenced by the positional fluctuation caused by the expansion of the optical reflecting member 12. The deterioration of the optical coupling state between the optical fiber and the semiconductor device is effectively suppressed.

The second support structure is realized by a plurality of stand pins 161a to 161d as shown in FIG. 8B. One end of each of the stand pins 161a to 161d is attached to the bottom face of the optical reflecting member 12 opposing the mounting surface. As the other end of each of the stand pins 161a to 161d is bonded and fixed to the mounting surface 2, the optical reflecting member 12 is fixed at a predetermined position within the housing 2 separated from the mounting surface.

When installing the resin-molded optical reflecting member 12, it is necessary to take account of the change in shape caused by the difference between the ambient temperature at the manufacture and that at the operation. Usually, stress strain remains in an optical reflecting member which has been molded from a resin through a thermal process in its assembling or the like. If the difference in temperature between the manufacturing environment and the operation environment is large, its change will cause the installed position of the reflecting surface to be displaced, its curvature to fluctuate (the shape of the optical reflecting member changes due to thermal expansion), and so forth. Therefore, the light-collecting position on the light-receiving surface of the PD may shift (the PD sensitivity may fluctuate).

The optical reflecting member 12 in the optical module according to the present invention may be provided with a structure for compensating the change caused by residual stress. As shown in FIG. 8C, the counter members 170 having a thermal expansion coeficient different from that of the optical reflecting member 12 are embedded in predetermined locations of the optical reflecting member 12. For example, in the case where the optical reflecting member 12 has a positive thermal expansion coefficient, a material having a negative thermal expansion coefficient is employed as the counter members 170.

Figure 8C:
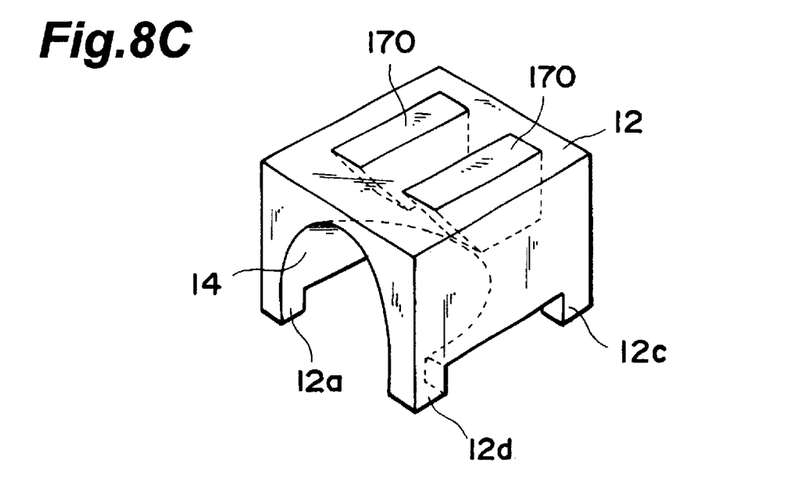
FIG. 8C shows a structure for preventing the optical reflecting member from deforming by means of counter members.

In the optical module according to the present invention, the support structure shown in FIG. 8A or 8B may also be combined with the structure shown in FIG. 8C.

Figure 10A:
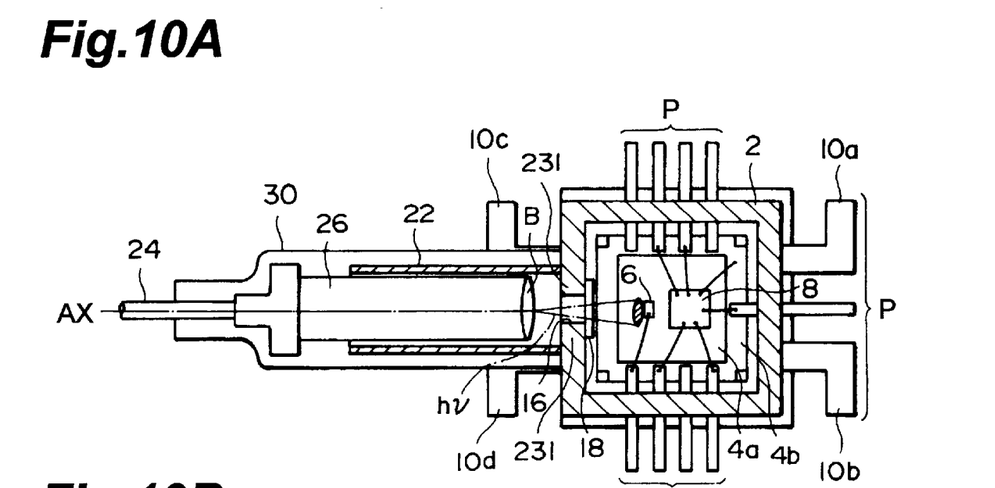
FIG. 10A is a sectional view taken along the I—I line in FIG. 4.
Figure 10B:
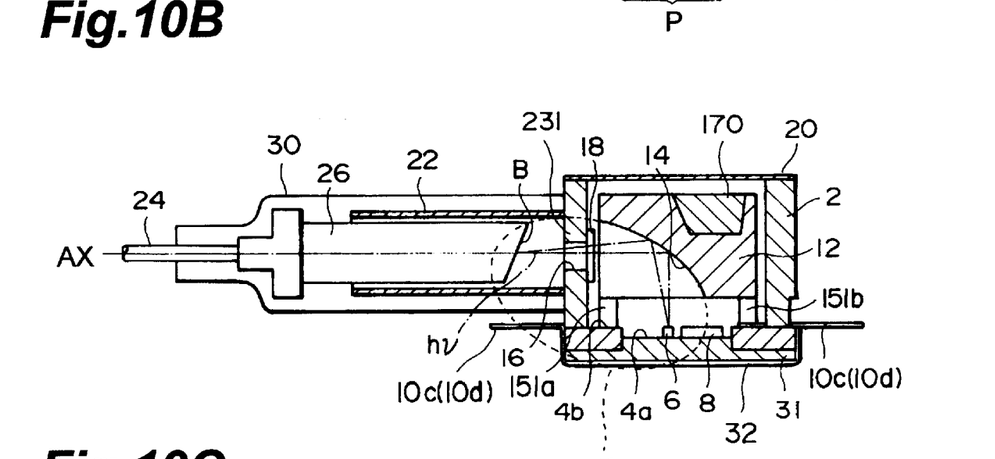
FIG. 10B is a sectional view taken along the II—II line in FIG. 4.
Figure 10C:
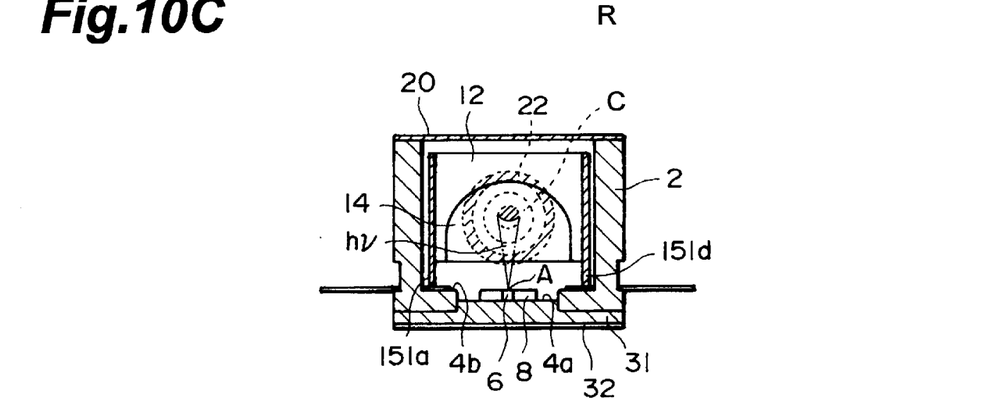
FIG. 10C is a sectional view taken along the III—III line in FIG. 4.

The inner configuration of the optical receiver module will now be explained. FIGS. 10A to 10C are sectional views showing the inner configuration of the optical receiver module shown in FIG. 4, in which FIG. 10A is a sectional view taken along the I—I line in FIG. 4, FIG. 10B is a sectional view taken along the II—II line in FIG. 4, and FIG. 10C is a sectional view taken along the III—III line in FIG. 4. Here, the optical reflecting member 12 installed in the housing 2 may have any of the configurations shown in FIGS. 8A to 8C.

In each of the sectional views shown in FIGS. 10A to 10C, a light-receiving device 6 such as PIN photodiode and a preamplifier circuit 8 for amplifying electronic signals outputted from the light-receiving device 6 are firmly attached to the inner bottom face 4a in the rectangular housing 2. The bottom face of the housing 2 is provided with a plurality of lead pins P such as power-supplying lead pins 10a, 10b for supplying electric power to the light-receiving device 6 and preamplifier circuit 8, signal output lead pins for outputting the output signals of the preamplifier circuit 8 to the outside, and ground lead pins 10c, 10d. These lead pins P and the light-receiving device and preamplifier circuit 8 are connected to each other with bending wire. Among the plurality of lead pins P, the power-supplying lead pins 10a, 10b and ground lead pins 10c, 10d are formed wider to lower their impedance and inductance to improving high-frequency characteristics and to prevent unstable operations such as high-frequency oscillation.

A side wall of the housing 2 is formed with a light entrance window 16 having a predetermined inside diameter defined by a flange 231, whereas a transparent member 18 (e.g., a sapphire window) firmly attached to the inner end face of the housing 2 covers the light entrance window 16. A tubular sleeve 22 matching the light entrance window 16 is attached to the outer end face of the housing 2, whereas the ferrule 26 attached to the front end of the optical fiber 24 is inserted into the sleeve 22. In these drawings, R indicates a virtually defined rotational ellipsoid, whereas C indicates the core of the optical fiber 24.

Above the light-receiving device 6 and preamplifier circuit 8, the resin-molded optical reflecting member 12 having substantially a rectangular shape, as shown in FIGS. 8A to 8C, is installed. The respective lower portions 151a and 151b, 151c and 151d of a pair of auxiliary plates 150a, 150b are firmly attached to the inner bottom face 4b with an adhesive or the like. Here, the counter members 170 having a thermal expansion coefficient higher than that of the optical reflecting member 12 are embedded in the upper face of the optical reflecting member 12.

The surface of the optical reflecting member 12 opposing the light-receiving device 6 is formed with the reflecting surface 14 having a concave surface form coinciding with a portion of a rotational ellipsoid. The optical reflecting member 12 is disposed such that the light-receiving surface of the light-receiving device 6 coincides with one focal point A of the rotational ellipsoid, whereas the end face (including the core end face) of the optical fiber 24 received in the ferrule 26 coincides with the other focal point B (see FIG. 5B).

The housing 2 is hermetically sealed with a lid 20.

The optical reflecting member 12 may also be used for optically coupling a light-emitting device and an optical fiber to each other in an optical transmitter module, and for optically coupling a plurality of optical fibers in an optical repeater or the like.

Though the resin-molded body is constituted by a polycarbonate resin in the optical reflecting member 12, the material of the resin-molded body should not be restricted to the polycarbonate resin. For example, such resins as liquid crystal polyester (LCP), polyphenylene sulfide (PPS), and polyether sulfone (PES) can be used.

Though the surface 143 provided with the reflecting film is processed into a concave form in conformity to a portion of the surface of a rotational ellipsoid in the optical reflecting member 12, it may be processed into a variety of other forms. For example, if the surface 143 is formed to be flat, the reflecting surface 14 will be manufactured more easily.

As explained in the foregoing, the optical module according to the present invention has a support structure for separating the optical reflecting member formed with a reflecting surface having a specific form from the mounting surface by a predetermined distance as shown in FIGS. 8A and 8B. This structure effectively suppresses the positional deviation and curvature fluctuation of the reflecting surface caused by the heat transmission from the mounting surface side. The optical coupling efficiency between the optical fiber and semiconductor device can be prevented from decreasing when the optical module is operated.

Also, in the optical module according to the present invention, the optical reflecting member may have a configuration in which, as shown in FIG. 8C, a counter member having a thermal expansion coefficient different from and compensated to that of the optical reflecting member is embedded. In this configuration, the optical reflecting member is less likely to change its shape due to the remaining stress. It is effective in that the optical coupling efficiency between the optical fiber and the semiconductor device can sufficiently be maintained without being influenced by changes in ambient temperature.

Further, as a Ni layer is formed between the resin-molded body and the Au layer constituting the reflecting surface, the optical reflecting member can secure the adhesion between the resin-molded body and the Ni and Au layers. Since the Ni layer is disposed between the resin-molded body and the Au layer for securing the adhesion of coating, the Au layer would not crack even under a high-temperature. As a result, the reflection characteristic would not deteriorate even under the high-temperature.

Also, by employing polycarbonate as the material for its base, the optical reflecting member can enhance its thermal resistance, shock resistance, and dimensional stability.

From the invention thus described, it will be obvious that the implementation of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical module comprising:
   a housing for installing a semiconductor device, said housing having a mounting surface on which said semiconductor device is mounted;

a sleeve for supporting a ferrule attached to a front end of an optical fiber, said sleeve extending along a predetermined direction from a side wall of said housing;

an optical reflecting member installed in said housing, said optical reflecting member having a reflecting surface with a predetermined form for optically coupling said optical fiber and said semiconductor device to each other; and a deterioration-suppressing structure for suppressing deterioration of an optical coupling state between said optical fiber and said semiconductor device;

wherein said optical reflecting member is made of resin material, and wherein said deterioration-suppressing structure includes a counter member embedded in a predetermined portion of said optical reflecting member and made of a resin material having a thermal expansion coefficient different from and compensated to that of said optical reflecting member.

2. An optical module according to claim 1, wherein said deterioration-suppressing structure includes a support structure maintaining said optical reflecting member at a predetermined position separated from said mounting surface within said housing by a predetermined distance.

3. An optical module according to claim 2, wherein said support structure includes at least a pair of auxiliary plates, a portion of each of said auxiliary plates being fixed to said mounting surface, said auxiliary plates supporting said optical reflecting member at a predetermined position by holding said optical reflecting member therebetween.

4. An optical module according to claim 3, wherein said pair of auxiliary plates are fixed to opposing side faces of said optical reflecting member with an adhesive respectively; and wherein bonding regions coated with said adhesive on said side faces of said optical reflecting member each have an area smaller than a the region covered with each of said pair of auxiliary plates on said each side face, said bonding regions being positioned to hold therebetween a predetermined region on said reflecting surface at which light emitted from said optical fiber is reflected.

5. An optical module according to claim 3, wherein each of said pair of auxiliary plates is mainly composed of a metal material or a ceramic material.

6. An optical module according to claim 1, wherein said optical reflecting member has a reflecting surface in a concave form coinciding with a portion of a virtually defined rotational ellipsoid.

7. An optical module according to claim 6, wherein said optical reflecting member is installed at a predetermined position such that a core end face of said optical fiber opposing said reflecting surface coincides with a first focal point of said rotational ellipsoid, whereas a main surface of said semiconductor device opposing said reflecting surface coincides with a second focal point of said rotational ellipsoid.

8. An optical module according to claim 2, wherein said support structure includes a plurality of stand pins each having one end fixed to a bottom face of said optical reflecting member, facing said mounting surface.

9. An optical module according to claim 8, wherein each of said plurality of stand pins is mainly composed of a metal material or a ceramic material.

10. An optical module according to claim 1, wherein said optical reflecting member comprises:

a resin-molded body having a surface with a predetermined form; and a reflecting film disposed on said surface of said resin-molded body, said reflecting film comprising an Ni layer and an Au layer covering said Ni layer.

11. An optical module according to claim 10, wherein said resin-molded body is mainly composed of polycarbonate.

* * * * *